United States Patent
Walters et al.

(10) Patent No.: US 10,628,262 B2
(45) Date of Patent: Apr. 21, 2020

(54) NODE RECOVERY IN STATIC DISTRIBUTED NETWORKS USING A STORED PROCESS STATE OF A DESIGNATED WEIGHT

(71) Applicant: Capital One Services, LLC, McLean, VA (US)

(72) Inventors: Austin Walters, Savoy, IL (US); Jeremy Goodsitt, Champaign, IL (US); Fardin Abdi Taghi Abad, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/169,739

(22) Filed: Oct. 24, 2018

(65) Prior Publication Data

US 2019/0286526 A1   Sep. 19, 2019

Related U.S. Application Data

(63) Continuation of application No. 15/921,195, filed on Mar. 14, 2018, now Pat. No. 10,140,184.

(51) Int. Cl.
| | | |
|---|---|---|
| *G06F 11/08* | (2006.01) | |
| *G06F 11/14* | (2006.01) | |
| *G06N 3/08* | (2006.01) | |
| *G06F 11/30* | (2006.01) | |

(52) U.S. Cl.
CPC ...... *G06F 11/1441* (2013.01); *G06F 11/1451* (2013.01); *G06F 11/3006* (2013.01); *G06F 11/3055* (2013.01); *G06N 3/08* (2013.01); *G06F 11/1448* (2013.01); *G06F 11/1476* (2013.01); *G06F 2201/805* (2013.01)

(58) Field of Classification Search
CPC .......... G06F 11/1441; G06F 2201/805; G06F 11/1438; G06F 11/1448; G06F 11/1451; G06F 11/1476; G06N 3/08
See application file for complete search history.

(56) References Cited

U.S. PATENT DOCUMENTS

| | | | | |
|---|---|---|---|---|
| 5,214,746 A | * | 5/1993 | Fogel | G06N 3/086 706/25 |
| 6,064,997 A | * | 5/2000 | Jagannathan | G06N 3/049 706/23 |
| 6,266,781 B1 | * | 7/2001 | Chung | G06F 11/1438 714/11 |

(Continued)

*Primary Examiner* — Joseph O Schell
(74) *Attorney, Agent, or Firm* — DLA Piper LLP US (57) ABSTRACT

A first static server configured to perform at least one first node process and a second static server configured to perform at least one second node process may be instantiated. A conglomerate server may periodically analyze the at least one first node process and the at least one second node process to identify a network process state based on the at least one first node process and the at least one second node process. The conglomerate server may store the network process state in a memory. A failure may be detected in the first static server. In response to the detecting, the first static server may be reinstantiated. The reinstantiating may comprise restarting the at least one first node process according to the network process state from the memory.

16 Claims, 8 Drawing Sheets

(56) References Cited

U.S. PATENT DOCUMENTS

| | | | | |
|---|---|---|---|---|
| 7,117,391 | B1* | 10/2006 | Hornick | G06F 11/1438 |
| | | | | 714/15 |
| 7,293,200 | B2* | 11/2007 | Neary | G06F 11/1482 |
| | | | | 714/11 |
| 2007/0260733 | A1* | 11/2007 | Havemose | G06F 11/1482 |
| | | | | 709/226 |
| 2013/0226923 | A1* | 8/2013 | Thing | G06F 16/162 |
| | | | | 707/737 |
| 2016/0203419 | A1* | 7/2016 | Chiang | G06N 3/126 |
| | | | | 706/13 |
| 2019/0042949 | A1* | 2/2019 | Young | G06N 3/063 |
| 2019/0179795 | A1* | 6/2019 | Huang | G06N 20/00 |

* cited by examiner

NODE RECOVERY IN STATIC DISTRIBUTED NETWORKS USING A STORED PROCESS STATE OF A DESIGNATED WEIGHT

CROSS-REFERENCE TO RELATED APPLICATION INFORMATION

This is a continuation of U.S. patent application Ser. No. 15/921,195, filed Mar. 14, 2018, the entirety of which is incorporated herein by reference.

BACKGROUND

Many distributed systems utilize static networks, wherein processing being performed by one network node is not easily transferrable to another node without losing progress. For example, in a neural network, training progress for a node and/or for an entire network may be lost when a single node of the neural network fails.

SUMMARY OF THE DISCLOSURE

Systems and methods described herein may provide node recovery in static distributed networks through the use of one or more conglomerate servers that may be configured to perform one or more node recovery tasks. In a static distributed network, each network node may have a static address (e.g., a static IP address). Accordingly, it may not be possible to dynamically offload node processing to a new address in the event of a problem at a node's static address. Instead, the node may be reinstantiated at the same address. To avoid losing processing progress due to reinstantiation, the conglomerate server may implement node recovery features.

For example, in a neural network system, node recovery features may include monitoring each distributed node and periodically averaging node weights, taking the best node weights, or a combination thereof. The averaged and/or best node weights may be stored so that when a node needs to restart, the conglomerate server may supply previously stored weights, allowing the node to pick up from the stored point rather than having to completely restart all processing. In embodiments wherein best node weights are stored, the conglomerate server may distribute the best node weights to nodes that do not need to restart, allowing the nodes to improve their training using the best available results.

For example, a method of operating a network may include instantiating a first static server configured to perform at least one first node process and instantiating a second static server configured to perform at least one second node process. The at least one first node process and the at least one second node process may be portions of a same network process. A conglomerate server may periodically analyze the at least one first node process and the at least one second node process to identify a network process state based on the at least one first node process and the at least one second node process. The conglomerate server may store the network process state in a memory. A failure may be detected in the first static server. The failure may cause an unrecoverable loss of progress in the at least one first node process. In response to the detecting, the first static server may be reinstated. The reinstantiating may include restarting the at least one first node process according to the network process state from the memory.

In some embodiments, the at least one first node process and the at least one second node process may be substantially identical processes.

In some embodiments, the at least one first node process and the at least one second node process may be different subsets of the same network process.

In some embodiments, the same network process may include a neural network training process. The network process state may be based on at least one neural network weight.

In some embodiments, the analyzing may include averaging at least one state of the at least one first node process and at least one state of the at least one second node process to determine an average state. The network process state may include the average state.

In some embodiments, the analyzing may include selecting a best result from the at least one first node process and the at least one second node process. The network process state may include the best result. In some embodiments, the conglomerate server may provide the best result to at least one of the first static server and the second static server. At least one of the at least one first node process and the at least one second node process may be updated with the best result provided by the conglomerate server. In some embodiments, at least one of the at least one first node process and the at least one second node process may include a neural network training process. The updating may include using the best result provided by the conglomerate server as training data for the neural network training process.

In another example, a conglomerate server device may include a processor and a non-transitory memory storing instructions that, when executed by the processor, cause the processor to perform processing. The processing may include periodically analyzing at least one first node process of a first static server and at least one second node process of a second static server to identify a network process state based on the at least one first node process and the at least one second node process and storing the network process state in the memory. The at least one first node process and the at least one second node process may be portions of a same network process. In response to a failure in the first static server causing an unrecoverable loss of progress in the at least one first node process, the processing may include reinstantiating the first static server. The reinstantiating may include restarting the at least one first node process according to the network process state from the memory.

In some embodiments, the analyzing may include averaging at least one state of the at least one first node process and at least one state of the at least one second node process to determine an average state. The network process state may include the average state.

In some embodiments, the analyzing may include selecting a best result from the at least one first node process and the at least one second node process. The network process state may include the best result. In some embodiments, the instructions may further cause the processor to perform processing including providing the best result to at least one of the first static server and the second static server. The best result provided to at least one of the first static server and the second static server may cause updating of at least one of the at least one first node process and the at least one second node process with the best result.

In some embodiments, the same network process may include a neural network training process. The network process state may be based on at least one neural network weight.

In some embodiments, the instructions may further cause the processor to perform processing comprising detecting the failure.

In another example, a non-transitory computer-readable medium may include instructions that, when executed by a processor, cause the processor to operate at least one parameter server instance. The instructions may include instructions for instantiating a first static server configured to perform at least one first node process. The at least one first node process may be a portion of a same network process as at least one second node process of a second static server. The instructions may include instructions for periodically reporting a state of the at least one first node process to a conglomerate server. The instructions may include instructions for reinstantiating the first static server in response to a failure in the first static server, wherein the failure causes an unrecoverable loss of progress in the at least one first node process. The reinstantiating may include receiving a network process state from the conglomerate server and restarting the at least one first node process according to the network process state from the conglomerate server.

In some embodiments, the at least one first node process and the at least one second node process may be substantially identical processes.

In some embodiments, the at least one first node process and the at least one second node process may be different subsets of the same network process.

In some embodiments, the at least one first node process may include a neural network training process.

In some embodiments, the instructions may further include instructions for receiving a best result from the conglomerate server and updating the at least one first node process with the best result provided by the conglomerate server. In some embodiments, the at least one first node process may include a neural network training process. The updating may include using the best result provided by the conglomerate server as training data for the neural network training process.

DETAILED DESCRIPTION OF SEVERAL EMBODIMENTS

FIGS. 1A-1D show a network 100 according to an embodiment of the present disclosure. Network 100 may include the Internet, one or more local or enterprise networks, other networks, and/or a combination thereof One or more conglomerate servers 102 may be connected to network 100. Conglomerate server 102 may be a computing device, such as a server or other computer. Conglomerate server 102 may be configured to monitor processing being performed by other network elements (e.g., parameter servers 112, 122, 132 and/or nodes 114, 124, 134). Conglomerate server 102 may be configured to process and store data related to the monitored processing (e.g., averaged weights and/or best weights). Conglomerate server 102 may be configured to distributed stored data to other network elements (e.g., send data to nodes 114, 124, 134 to improve processing and/or send data to enable nodes 114, 124, 134 to restart).

Conglomerate server 102 is depicted as a single server in FIGS. 1A-1D for ease of illustration, but those of ordinary skill in the art will appreciate that conglomerate server 102 may be embodied in different forms for different implementations. For example, conglomerate server 102 may include a plurality of servers. In some embodiments, each of the plurality of conglomerate servers 102 may be configured to interact with separate and/or overlapping sets of network 100 elements, for example.

A plurality of separate neural networks 110, 120, 130 may form part of network 100. Each neural network 110, 120, 130 may include a parameter server 112, 122, 132 and worker node(s) 114, 124, 134. Neural networks 110, 120, 130 may utilize any parameter server 112, 122, 132 and worker node 114, 124, 134 arrangement available in the art of machine learning to perform any machine learning task. Each worker node 114, 124, 134 may be configured to be trained according to any machine learning technique available in the art and For purposes of illustration, it may be understood that each worker node 114, 124, 134 may be stateless in that if a worker node 114, 124, 134 fails, it must be restarted, and any training progress may be lost.

Each parameter server 112, 122, 132 is depicted as a single server in FIGS. 1A-1D for ease of illustration, but those of ordinary skill in the art will appreciate that parameter servers 112, 122, 132 may be embodied in different forms for different implementations. For example, one or more parameter servers 112, 122, 132 may include a plurality of servers. In some embodiments, one or more parameter servers 112, 122, 132 may be embodied physically in a same machine as conglomerate server 102. Furthermore, while each neural network 110, 120, 130 is illustrated with two worker nodes (e.g., nodes 114A and 114B of network 110, nodes 124A and 124B of network 120, and nodes 124A and 124B of network 120), each neural network 110, 120, 130 may have any number of worker nodes.

Figure 1A:
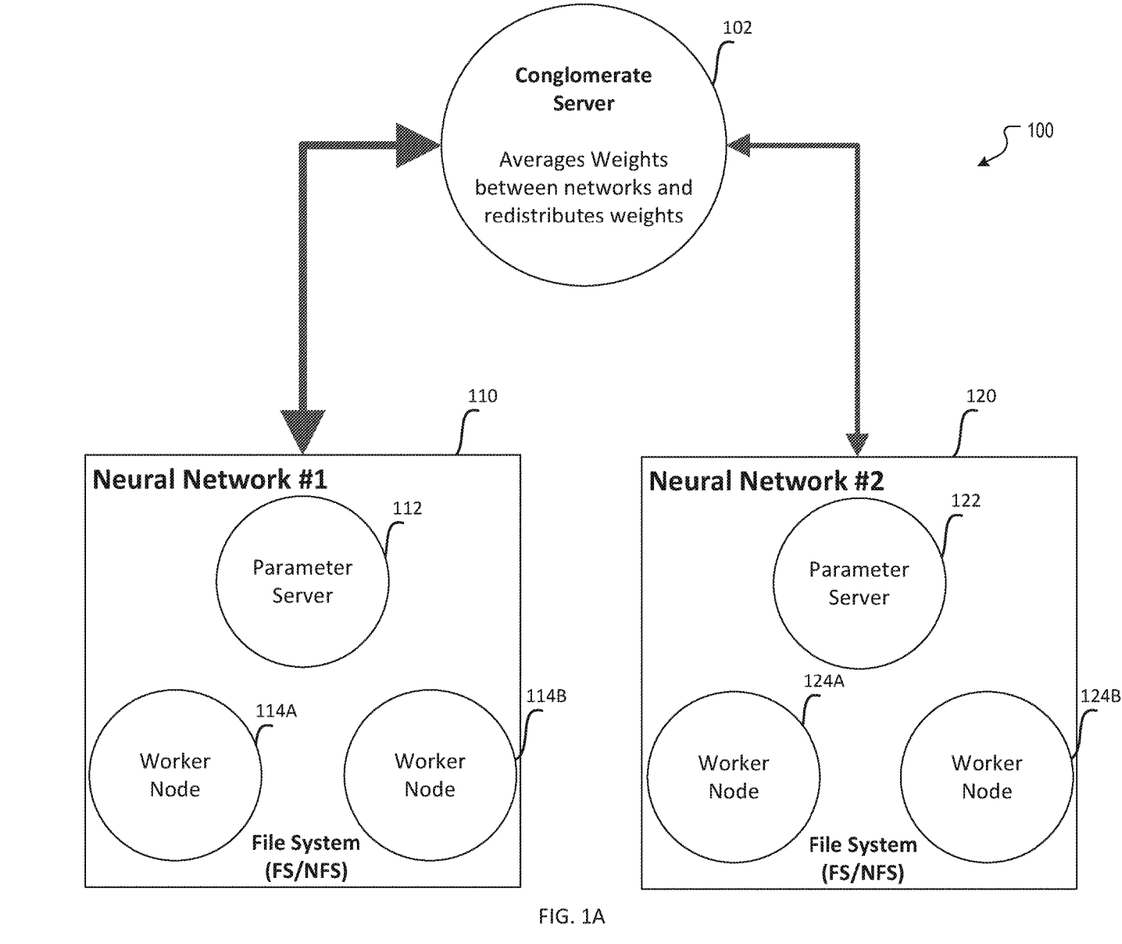
FIGS. 1A-1D show a network including a conglomerate server and parameter servers according to an embodiment of the present disclosure.

FIGS. 1A-1D show a sequence wherein a worker node (worker node 124B) crashes, and conglomerate server 102 responds by performing recovery procedures. In FIG. 1A, all worker nodes 114A, 114B, 124A, 124B are behaving normally. Conglomerate server 102 may receive and process data from nodes 114A, 114B, 124A, 124B as described below in the context of FIGS. 3-5. For example, conglomerate server 102 may periodically average the weights of nodes 114A, 114B, 124A, 124B as they undergo training and store the weights in a memory accessible to conglomerate server 102.

Figure 1B:
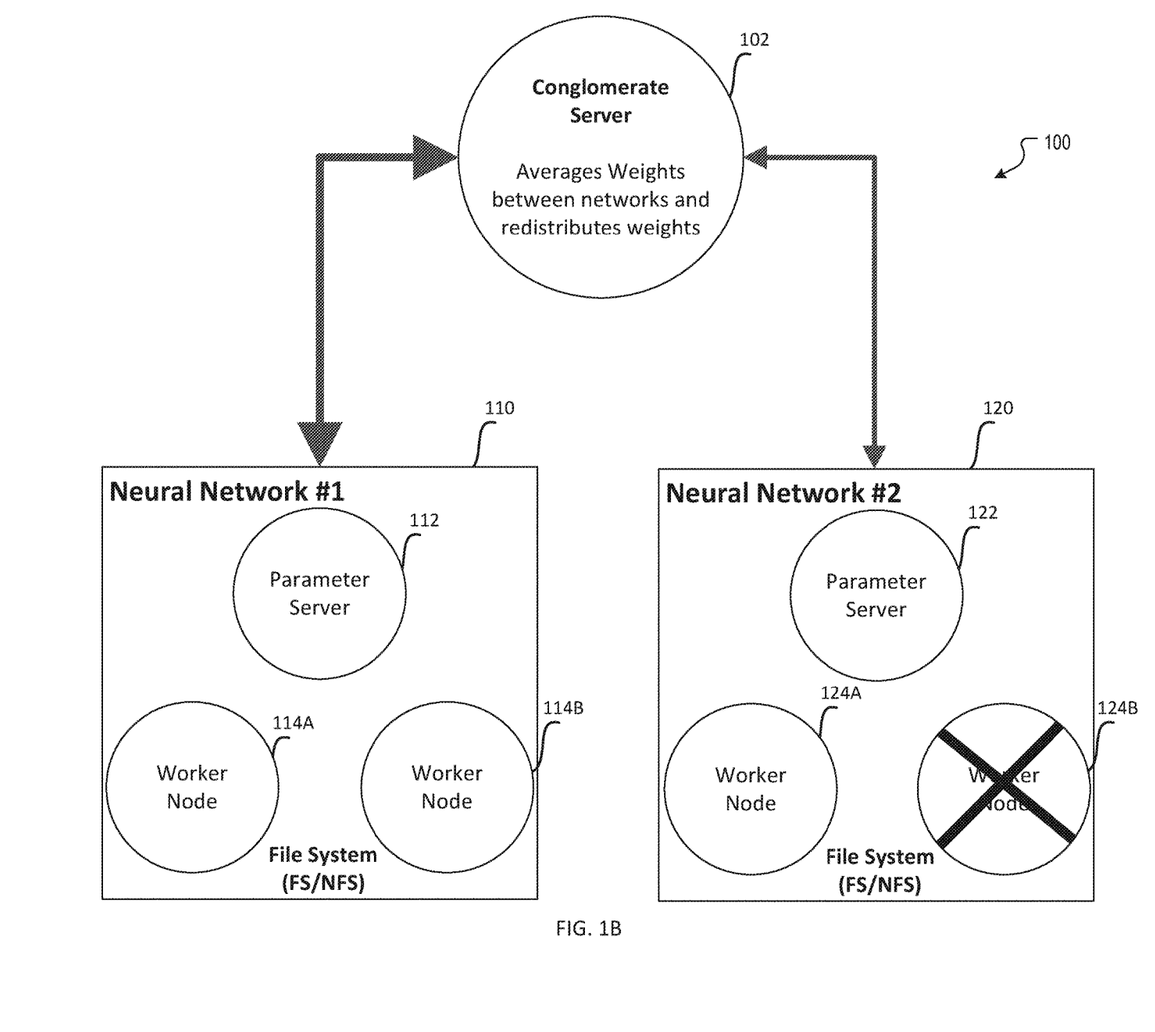
Figure 1C:
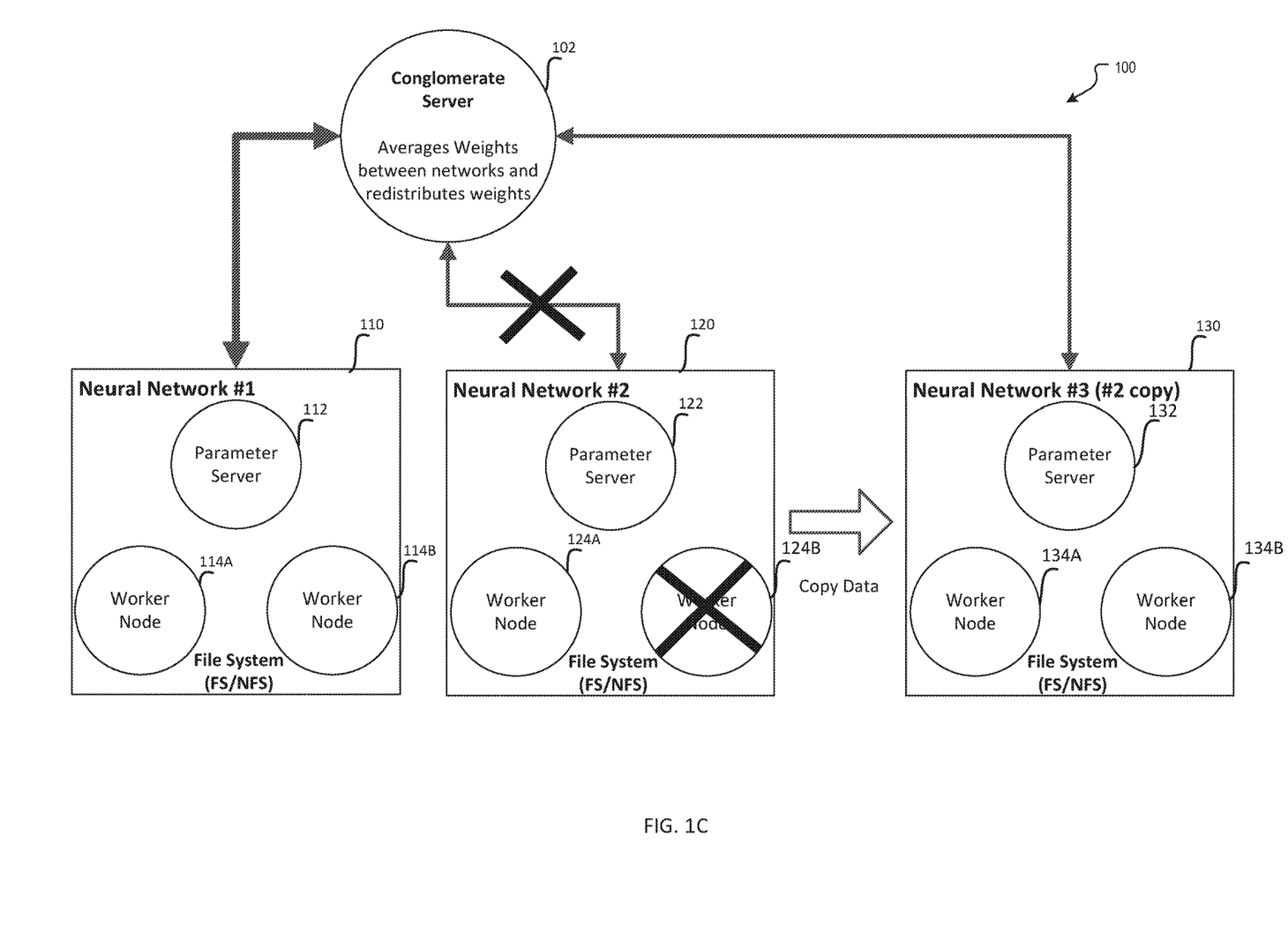
Figure 1D:
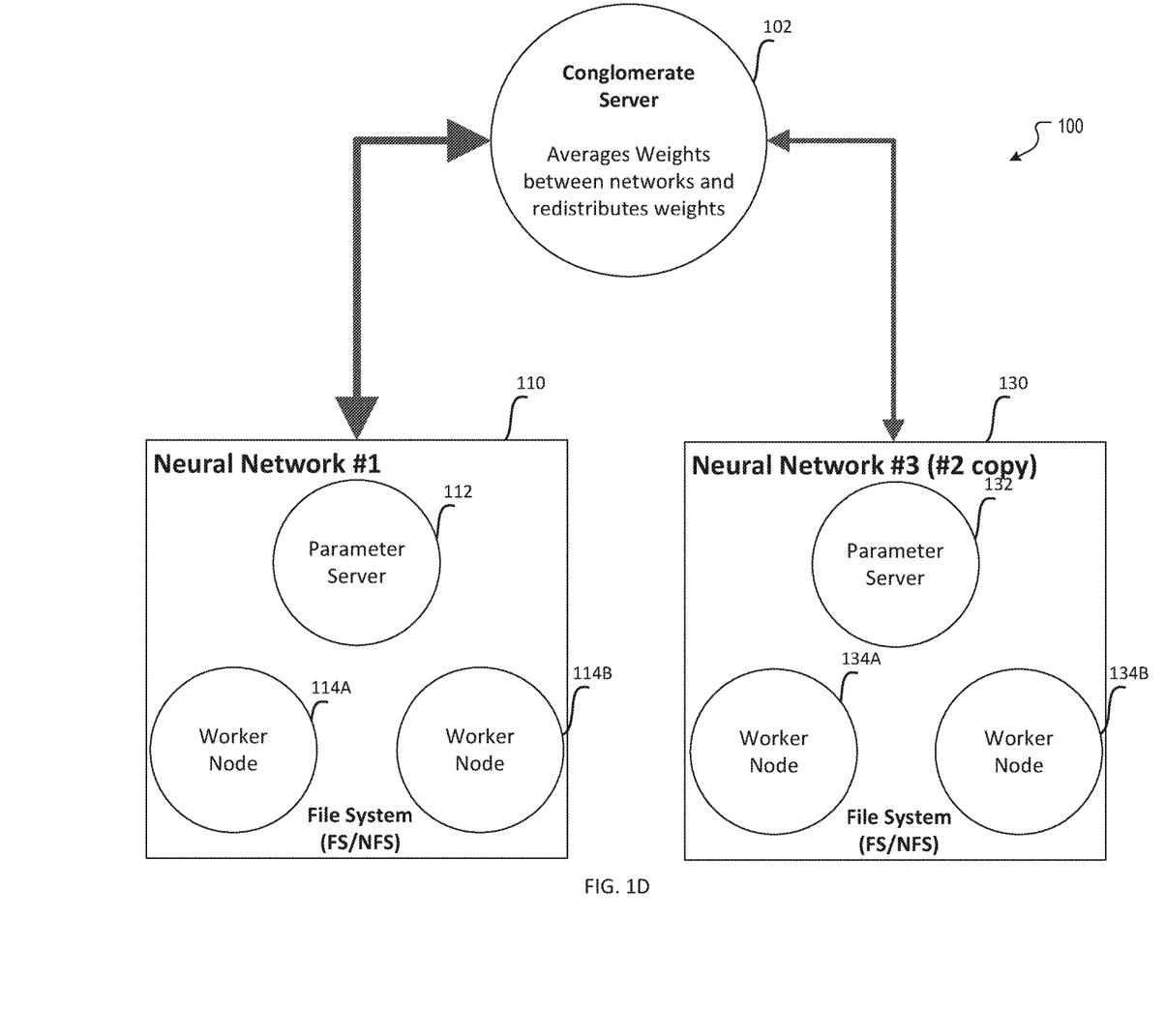

In FIG. 1B, worker node 124B may crash or otherwise stop functioning properly. Accordingly, as shown in FIG. 1C, conglomerate server 102 may terminate the neural network containing the malfunctioning node 124B (neural network 120). Conglomerate server 102 may instantiate a new neural network 130 including a new parameter server 132 and new worker nodes 134A and 134B. Because conglomerate server 102 has stored averaged weights, conglomerate server 102 may supply the stored averaged weights to new neural network 130. Accordingly, new worker nodes 134A and 134B may pick up where processing left off as of the time of last storage of average weights by conglomerate server 102, as shown in FIG. 1D. Specific processes enabling this recovery are described in greater detail below in the context of FIGS. 3-5.

In some embodiments, conglomerate server 102 and/or other network elements may maintain the weight information (e.g., the averaged weights and/or best weights) in a network file system (NFS) or other distributed file system. For example, to accomplish the sending of node data to conglomerate server 102, nodes 114A, 114B, 124A, 124B, 134A, 134B and/or parameter servers 112, 122, 132 may store the node data in the NFS. Conglomerate server 102 may process the node data and store the processed node data (e.g., the averaged weights and/or best weights) in the NFS. Thus, when one or more nodes (e.g., worker nodes 134A and 134B) are reinstantiated, the data for restarting the nodes with the stored weights may come directly from the NFS.

Figure 2:
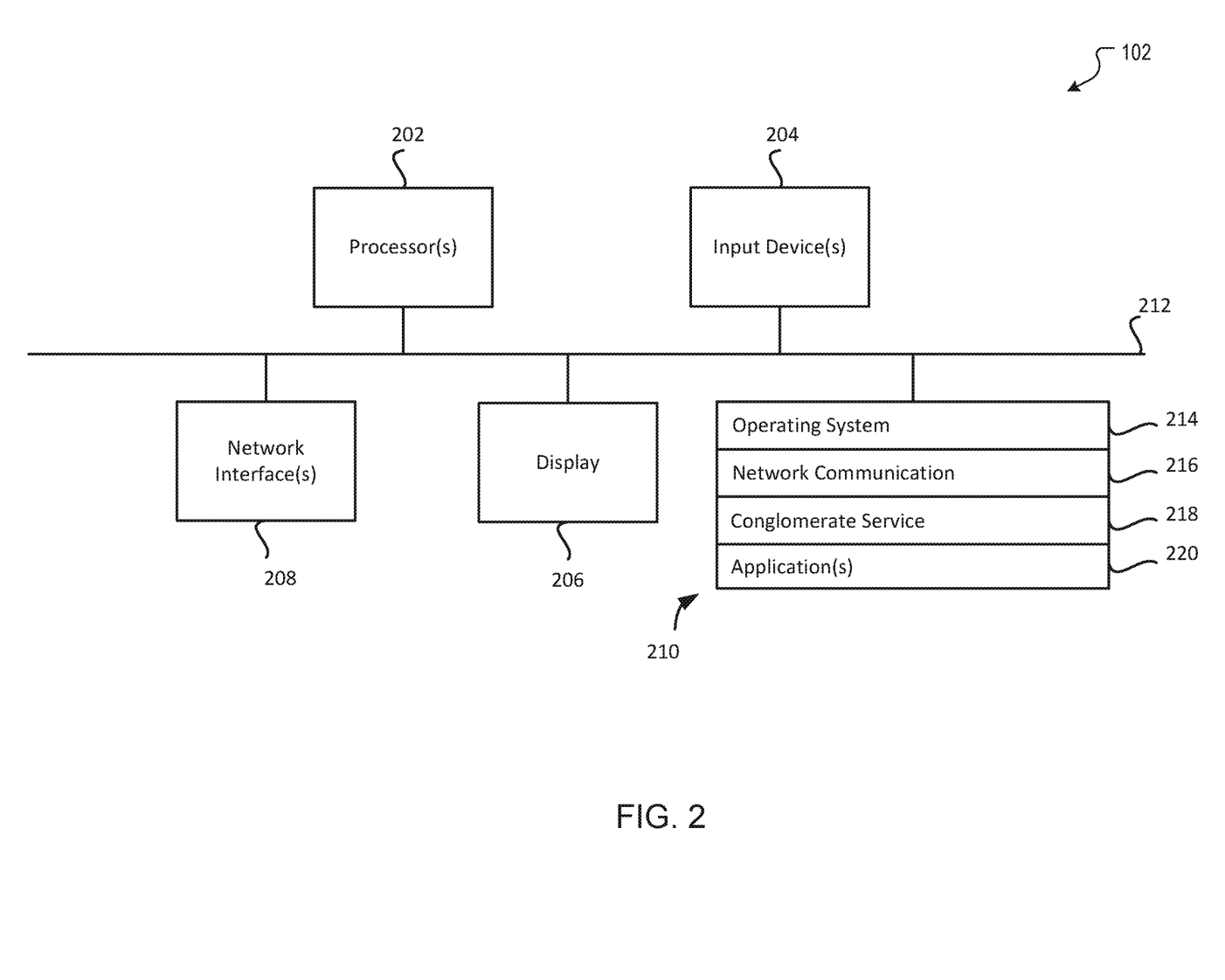
FIG. 2 shows a server device according to an embodiment of the present disclosure.

FIG. 2 is a block diagram of an example computing device 200 that may implement various features and processes as described herein. The computing device 200 may be implemented on any electronic device that runs software applications derived from compiled instructions, including without limitation personal computers, servers, smart phones, media players, electronic tablets, game consoles, email devices, etc. In some implementations, the computing device 200 may include one or more processors 202, one or more input devices 204, one or more display devices 206, one or more network interfaces 208, and one or more computer-readable mediums 210. Each of these components may be coupled by bus 212.

Display device 206 may be any known display technology, including but not limited to display devices using Liquid Crystal Display (LCD) or Light Emitting Diode (LED) technology. Processor(s) 202 may use any known processor technology, including but not limited to graphics processors and multi-core processors. Input device 204 may be any known input device technology, including but not limited to a keyboard (including a virtual keyboard), mouse, track ball, and touch-sensitive pad or display. Bus 212 may be any known internal or external bus technology, including but not limited to ISA, EISA, PCI, PCI Express, NuBus, USB, Serial ATA or FireWire. Computer-readable medium 210 may be any medium that participates in providing instructions to processor(s) 202 for execution, including without limitation, non-volatile storage media (e.g., optical disks, magnetic disks, flash drives, etc.), or volatile media (e.g., SDRAM, ROM, etc.).

Computer-readable medium 210 may include various instructions 214 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 204; sending output to display device 206; keeping track of files and directories on computer-readable medium 210; controlling peripheral devices (e.g., disk drives, printers, etc.) which can be controlled directly or through an I/O controller; and managing traffic on bus 212. Network communications instructions 216 may establish and maintain network connections (e.g., software for implementing communication protocols, such as TCP/IP, HTTP, Ethernet, telephony, etc.).

Conglomerate service instructions 218 can include instructions that monitor nodes and/or provide for node recovery as described herein. For example, conglomerate service instructions 218 may average weights between networks, determine best weights among networks, and/or redistribute weights to networks.

Application(s) 220 may be an application that uses or implements the processes described herein and/or other processes. The processes may also be implemented in operating system 214.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 3:
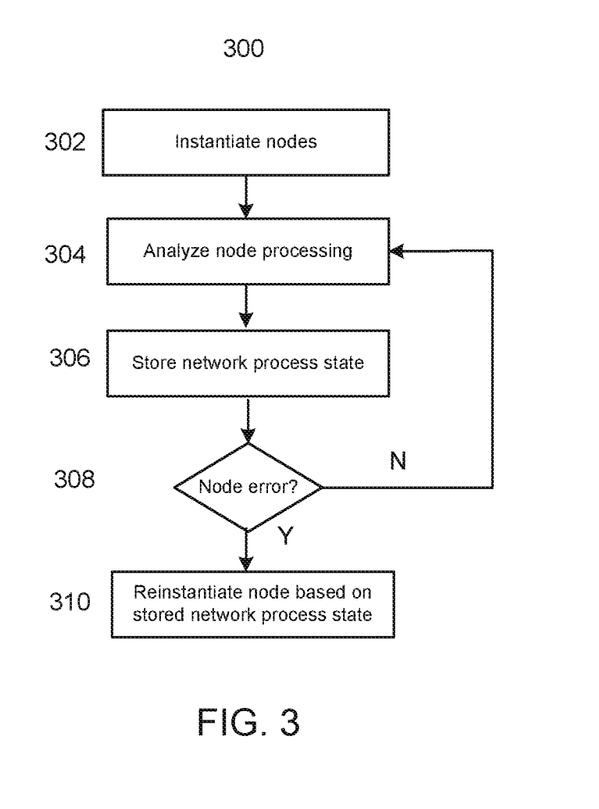
FIG. 3 shows a monitoring and restoring process according to an embodiment of the present disclosure.

FIG. 3 shows a monitoring and restoring process 300 according to an embodiment of the present disclosure. Conglomerate server 102 may perform process 300 to restore static node elements in the event of node errors, for example.

At 302, conglomerate server 102 may instantiate other elements of network 100, such as individual neural networks and subcomponents thereof (e.g., parameter servers and worker nodes). Using FIG. 1A as an example, conglomerate server 102 may instantiate a first neural network 110 including parameter server 112 and worker nodes 114A and 114B. Conglomerate server 102 may also instantiate a second neural network 120 including parameter server 122 and worker nodes 124A and 124B. The instantiated neural networks 110, 120 may begin processing. For example, the processing may include training of worker nodes 114A, 114B, 124A, 124B.

At 304, conglomerate server 102 may analyze processing being performed by worker nodes 114A, 114B, 124A, 124B. For example, parameter server 112 may periodically obtain current weights from worker nodes 114A, 114B, and parameter server 122 may periodically obtain current weights from worker nodes 124A, 124B. Upon obtaining the weights, parameter servers 112, 122 may send the weights to conglomerate server 102. Thus, conglomerate server 102 may periodically receive weights from all worker nodes 114A, 114B, 124A, 124B in network 100. For example, conglomerate server 102 may obtain the weights every 1000 epochs or at some other rate. Conglomerate server 102 may analyze the weights when they are received. For example, the analyzing may include averaging the weights received from all worker nodes 114A, 114B, 124A, 124B to obtain an average weight. The analyzing may include evaluating the weights received from all worker nodes 114A, 114B, 124A, 124B to identify a best weight of the received weights.

At 306, conglomerate server 102 may store a network process state. For example, in embodiments wherein conglomerate server 102 determined an average weight at 304, conglomerate server 102 may store the average weight as the network process state. In embodiments wherein conglomerate server 102 determined a best weight at 304, conglomerate server 102 may store the best weight as the network process state. Conglomerate server 102 may store the network process state in a local memory and/or a remote memory (e.g., a remote database) accessible to conglomerate server 102.

At 308, conglomerate server 102 may check for one or more errors and, if one or more errors are detected, determine that one or more nodes must be restarted. In some embodiments, conglomerate server 102 may be configured to detect errors in parameter servers and/or nodes (e.g., a malfunctioning node may fail to report weights or may report weights erroneously at 304). In some embodiments, a parameter server may report a node error to conglomerate server 102. For example, in FIG. 1B, worker node 124B has stopped functioning properly. Conglomerate server 102 may detect this malfunction and/or receive a report of the malfunction from parameter server 122. If no node errors are detected, conglomerate server 102 may wait for the next weights from worker nodes 114A, 114B, 124A, 124B (i.e., process 300 may return to 304 after a length of time such as 1000 epochs). If one or more node errors are detected, process 300 may proceed to 310.

At 310, conglomerate server 102 may reinstantiate one or more portions of network 100 to respond to detected node error(s). Using FIGS. 1C and 1D as an example, due to the error at worker node 124B, conglomerate server 102 may terminate the second neural network 120 and instantiate a third neural network 130. Third neural network 130 may include parameter server 132 and worker nodes 134A, 134B. Third neural network 130 may be a copy of second neural network 120. However, because the neural networks are static, third neural network 130 may not be able to start processing where second neural network 120 left off on its own. Accordingly, conglomerate server 102 may instantiate third neural network 130 using the network process state stored at 306. For example, conglomerate server 102 may retrieve the most recent averaged weight or best weight from memory and supply the weight to new worker nodes 134A, 134B. Worker nodes 134A, 134B may be able to continue training based on the supplied weight.

Process 300 describes an example wherein a single node fails. However, process 300 may be extended to recover from multiple node failure and/or failure of the entire network 100. For example, conglomerate server 102 may store the network process state in an NFS, which may maintain the storage even if a critical node of network 100 fails (e.g., if an entire parameter server 112 fails, or if conglomerate server 102 fails). Upon reinstantiation of the failed portion of network 100, the reinstantiated portion may read the NFS to obtain the most recently stored network process state and resume processing in the same manner as described with respect to process 300.

Figure 4:
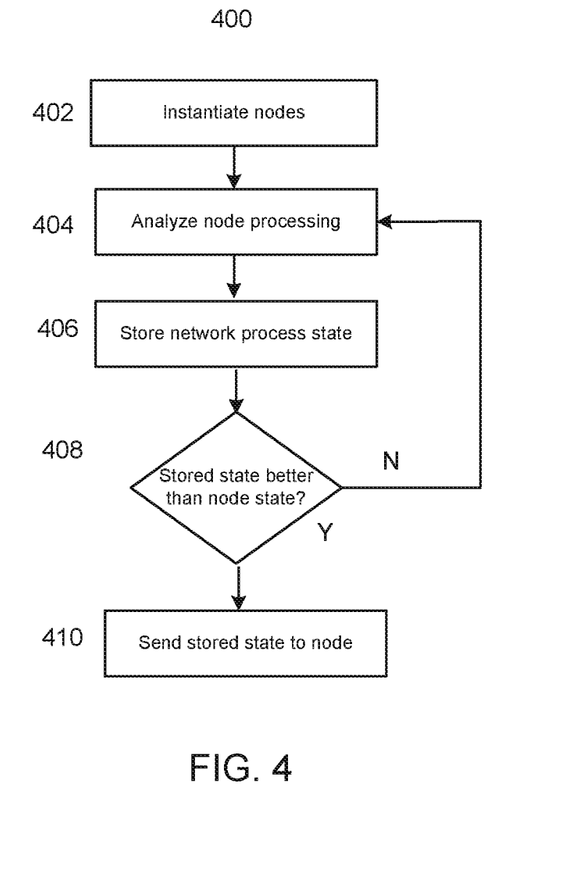
FIG. 4 shows a monitoring and updating process according to an embodiment of the present disclosure.

FIG. 4 shows a monitoring and updating process 400 according to an embodiment of the present disclosure. Conglomerate server 102 may perform process 400 to optimize processing being performed by static node elements, for example. In some embodiments, conglomerate server 102 may perform process 300 and process 400 concurrently, and some steps of each process 300, 400 may be the same for both processes 300, 400. In these embodiments, conglomerate server 102 may utilize the same processing for both processes 300, 400 as indicated below.

At 402, conglomerate server 102 may instantiate other elements of network 100, such as individual neural networks and subcomponents thereof (e.g., parameter servers and worker nodes). Using FIG. 1A as an example, conglomerate server 102 may instantiate a first neural network 110 including parameter server 112 and worker nodes 114A and 114B. Conglomerate server 102 may also instantiate a second neural network 120 including parameter server 122 and worker nodes 124A and 124B. The instantiated neural networks 110, 120 may begin processing. For example, the processing may include training of worker nodes 114A, 114B, 124A, 124B. Note that in embodiments wherein conglomerate server 102 is performing process 300 and process 400 concurrently, only one of step 302 and step 402 may be performed, as steps 302 and 402 may be identical.

At 404, conglomerate server 102 may analyze processing being performed by worker nodes 114A, 114B, 124A, 124B. For example, parameter server 112 may periodically obtain current weights from worker nodes 114A, 114B, and parameter server 122 may periodically obtain current weights from worker nodes 124A, 124B. Upon obtaining the weights, parameter servers 112, 122 may send the weights to conglomerate server 102. Thus, conglomerate server 102 may periodically receive weights from all worker nodes 114A, 114B, 124A, 124B in network 100. For example, conglomerate server 102 may obtain the weights every 1000 epochs or at some other rate. Conglomerate server 102 may analyze the weights when they are received. For example, the analyzing may include averaging the weights received from all worker nodes 114A, 114B, 124A, 124B to obtain an average weight. The analyzing may include evaluating the weights received from all worker nodes 114A, 114B, 124A, 124B to identify a best weight of the received weights. Note that in embodiments wherein conglomerate server 102 is performing process 300 and process 400 concurrently, only one of step 304 and step 404 may be performed, as steps 304 and 404 may be identical.

At 406, conglomerate server 102 may store a network process state. For example, in embodiments wherein conglomerate server 102 determined an average weight at 304, conglomerate server 102 may store the average weight as the network process state. In embodiments wherein conglomerate server 102 determined a best weight at 304, conglomerate server 102 may store the best weight as the network process state. Conglomerate server 102 may store the network process state in a local memory and/or a remote memory (e.g., a remote database) accessible to conglomerate server 102. Note that in embodiments wherein conglomerate server 102 is performing process 300 and process 400 concurrently, only one of step 306 and step 406 may be performed, as steps 306 and 406 may be identical.

At 408, conglomerate server 102 may compare the stored average weight or best weight with the most recently received weights from worker nodes 114A, 114B, 124A, 124B to determine whether any worker nodes 114A, 114B, 124A, 124B have a weight that is worse than the stored average weight or best weight. If no nodes 114A, 114B, 124A, 124B have a weight that is worse than the stored average weight or best weight, conglomerate server 102 may wait for the next weights from worker nodes 114A, 114B, 124A, 124B (i.e., process 400 may return to 404 after a length of time such as 1000 epochs). If one or more nodes 114A, 114B, 124A, 124B have a weight that is worse than the stored average weight or best weight, process 400 may proceed to 410.

At 410, conglomerate server 102 may send the stored average weight or best weight to any worker node(s) 114A, 114B, 124A, 124B determined to have a weight that is worse than the stored average weight or best weight as a result of the comparing. Accordingly, nodes receiving the stored weight from conglomerate server 102 may continue training using the provided weight rather than the weight they had been using (e.g., the weight that is worse than the stored average weight or best weight). This may allow conglomerate server 102 to optimize training by improving the weights of nodes to be at least as good as an average or best weight for network 100.

Figure 5:
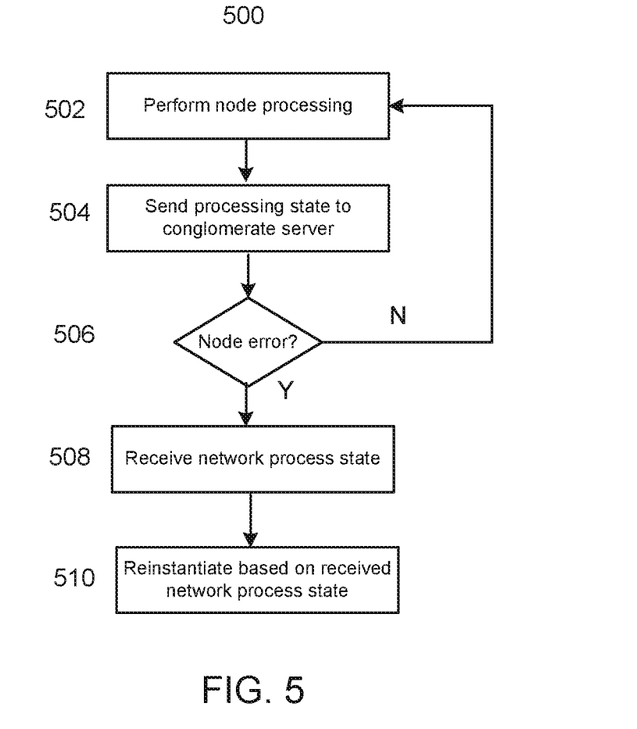
FIG. 5 shows a processing and restoring process according to an embodiment of the present disclosure.

FIG. 5 shows a processing and restoring process 500 according to an embodiment of the present disclosure. The following example tracks FIGS. 1A-1D above and is performed by elements of neural networks 120 and 130. However, any neural network (e.g., neural network 110) may perform similar processing.

At 502, neural network 120 may perform node processing. Using to FIG. 1A as an example, each worker node 114A, 114B, 124A, 124B may perform machine learning training under the direction of its respective parameter server 112, 122.

At 504, neural network 120 may provide a current processing state to conglomerate server 102. For example, conglomerate server 102 may inspect worker nodes 114A, 114B, 124A, 124B to determine a current state of their machine learning training (e.g., a current weight for each node 114A, 114B, 124A, 124B). In other embodiments, each node 114A, 114B, 124A, 124B or each parameter server 112, 122 may report the current state to conglomerate server 102. Using the reported state, conglomerate server 102 may perform process 300 and/or process 400 as described above.

At 506, neural network 120 may encounter a node error. For example, conglomerate server 102 may detect an error in a node and/or the node and/or associated parameter server may report the error. Using FIG. 1B as an example, node 124B may stop working (e.g., including failing to report its current weight or the like). If no error is encountered, worker nodes 114A, 114B, 124A, 124B may continue processing at 502, and conglomerate server 102 may receive processing state at 504, repeatedly (e.g., conglomerate server 102 may receive processing state every 1000 processing epochs or the like).

At 508, neural network 130 may receive the network process state from conglomerate server 102 to reinstantiate the failed node (e.g., node 124B) and, in some embodiments, related processes. For example, as shown in FIG. 1C, neural network 120 may need to be restarted as a result of node 124B failure. Accordingly, conglomerate server 102 may retrieve a previously stored network process state so that a reinstantiated neural network may need not restart from the beginning of its processing, as described above.

At 510, neural network 130 may reinstantiate the failed node (e.g., node 124B) and, in some embodiments, related processes based on the received network process state. For example, as shown in FIGS. 1C and 1D, neural network 120 may be terminated, and new neural network 130 may be instantiated using the received network process state. New neural network 130 may be a copy of shut down neural network 120 and may resume processing using weights provided by the received network process state, as described above.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method of operating a network, the method comprising:
instantiating a first static server configured to perform at least one first node process;
instantiating a second static server configured to perform at least one second node process, wherein the at least one first node process and the at least one second node process are portions of a same network process;
periodically analyzing, by a conglomerate server, the at least one first node process and the at least one second node process to designate a weight from respective weights of the at least one first node process and the at least one second node process as a designated weight and identify a network process state including the designated weight and storing, by the conglomerate server, the network process state in a memory;
detecting a failure in the first static server, wherein the failure causes an unrecoverable loss of progress in the at least one first node process; and
in response to the detecting, reinstantiating the first static server, the reinstantiating comprising restarting the at least one first node process according to the network process state from the memory.

2. The method of claim 1, wherein the at least one first node process and the at least one second node process are performing same processing on same data.

3. The method of claim 1, wherein the at least one first node process and the at least one second node process are different subsets of the same network process.

4. The method of claim 1, wherein:
the same network process comprises a neural network training process; and
the designated weight includes at least one neural network weight.

5. The method of claim 1, further comprising:
providing, by the conglomerate server, the designated weight to at least one of the first static server and the second static server; and
updating at least one of the at least one first node process and the at least one second node process with the designated weight provided by the conglomerate server.

6. The method of claim 5, wherein:
at least one of the at least one first node process and the at least one second node process comprises a neural network training process; and
the updating comprises using the designated weight provided by the conglomerate server as training data for the neural network training process.

7. A conglomerate server device comprising:
a processor; and
a non-transitory memory storing instructions that, when executed by the processor, cause the processor to perform processing comprising:
periodically analyzing at least one first node process of a first static server and at least one second node process of a second static server to designate a weight from respective weights of the at least one first node process and the at least one second node process as a designated weight and identify a network process state including the designated weight and storing the network process state in the memory, wherein the at least one first node process and the at least one second node process are portions of a same network process; and
in response to a failure in the first static server causing an unrecoverable loss of progress in the at least one first node process, reinstantiating the first static server, the reinstantiating comprising restarting the at least one first node process according to the network process state from the memory.

8. The device of claim 7, wherein:
the instructions further cause the processor to perform processing comprising providing the designated weight to at least one of the first static server and the second static server; and
the designated weight provided to at least one of the first static server and the second static server causes updating of at least one of the at least one first node process and the at least one second node process with the designated weight.

9. The device of claim 7, wherein:
the same network process comprises a neural network training process; and
the designated weight includes at least one neural network weight.

10. The device of claim 7, wherein the instructions further cause the processor to perform processing comprising detecting the failure.

11. A non-transitory computer-readable medium comprising instructions that, when executed by a processor, cause the processor to operate at least one parameter server instance, the instructions comprising instructions for:
instantiating a first static server configured to perform at least one first node process, wherein the at least one first node process is a portion of a same network process as at least one second node process of a second static server;
periodically reporting a state of the at least one first node process to a conglomerate server; and
in response to a failure in the first static server, wherein the failure causes an unrecoverable loss of progress in the at least one first node process, reinstantiating the first static server, the reinstantiating comprising:
receiving a network process state including a designated weight selected from respective weights of the at least one first node process and the at least one second node process from the conglomerate server, wherein the conglomerate server has selected the network process state by periodically analyzing the at least one first node process and the at least one second node process to designate a weight from respective weights of the at least one first node process and the at least one second node process as the designated weight and identify a network process state including the designated weight, and
restarting the at least one first node process according to the network process state from the conglomerate server.

12. The non-transitory computer-readable medium of claim 11, wherein the at least one first node process and the at least one second node process are performing same processing on same data.

13. The non-transitory computer-readable medium of claim 11, wherein the at least one first node process and the at least one second node process are different subsets of the same network process.

14. The non-transitory computer-readable medium of claim 11, wherein the at least one first node process comprises a neural network training process.

15. The non-transitory computer-readable medium of claim 11, the instructions further comprising instructions for:
   receiving the designated weight from the conglomerate server; and
   updating the at least one first node process with the designated weight provided by the conglomerate server.

16. The non-transitory computer-readable medium of claim 15, wherein:
   the at least one first node process comprises a neural network training process; and
   the updating comprises using the designated weight provided by the conglomerate server as training data for the neural network training process.

* * * * *